US011958483B2

United States Patent
Okubo (10) Patent No.: US 11,958,483 B2
(45) Date of Patent: Apr. 16, 2024

(54) VEHICLE EXTERNAL ENVIRONMENT RECOGNITION APPARATUS

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 335 days.

(21) Appl. No.: 17/465,004

(22) Filed: Sep. 2, 2021

(65) Prior Publication Data
US 2022/0073066 A1 Mar. 10, 2022

(30) Foreign Application Priority Data

Sep. 4, 2020 (JP) ................. 2020-148665

(51) Int. Cl.
*B60W 30/095* (2012.01)
*B60W 40/105* (2012.01)
(Continued)

(52) U.S. Cl.
CPC ...... *B60W 30/0956* (2013.01); *B60W 40/105* (2013.01); *G06V 20/584* (2022.01); *G06V 20/588* (2022.01); *B60W 2420/403* (2013.01); *B60W 2552/00* (2020.02); *B60W 2554/4041* (2020.02); *B60W 2554/80* (2020.02)

(58) Field of Classification Search
CPC .......... B60W 30/0956; B60W 40/105; B60W 2420/42; B60W 2552/00; B60W 2554/4041; B60W 2554/80; G06V 20/584; G06V 20/588; G06V 20/58; B60K 2031/0025
See application file for complete search history.

(56) References Cited

U.S. PATENT DOCUMENTS

2015/0198711 A1\* 7/2015 Zeng ................... G01S 13/9029
342/59

FOREIGN PATENT DOCUMENTS

JP 3349060 B2 11/2002

OTHER PUBLICATIONS

Translation of JP 3349060 (Year: 2002).\*

\* cited by examiner

*Primary Examiner* — Kenneth J Malkowski
(74) *Attorney, Agent, or Firm* — Rimon P.C.

(57) ABSTRACT

A vehicle external environment recognition apparatus to be applied to a vehicle includes a position calculation processor, a three-dimensional object determination processor, an identification object identifying processor, and a vehicle tracking processor. The position calculation processor calculates three-dimensional positions of respective blocks in a captured image. The three-dimensional object determination processor groups the blocks to put any two or more of the blocks that have the three-dimensional positions differing from each other within a predetermined range in a group and thereby determines three-dimensional objects. The identification object identifying processor identifies a preceding vehicle relative to the vehicle and a sidewall on the basis of the three-dimensional objects. The vehicle tracking processor estimates a future position of the preceding vehicle to track the preceding vehicle. The vehicle tracking processor determines whether or not the preceding vehicle identified by the identification object identifying processor corresponds to a portion of the sidewall.

12 Claims, 9 Drawing Sheets

(51) Int. Cl.
*G06V 20/56* (2022.01)
*G06V 20/58* (2022.01)

VEHICLE EXTERNAL ENVIRONMENT RECOGNITION APPARATUS

CROSS-REFERENCE TO RELATED APPLICATIONS

This application claims priority from Japanese Patent Application No. 2020-148665 filed on Sep. 4, 2020, the entire contents of which are hereby incorporated by reference.

BACKGROUND

The technology relates to a vehicle external environment recognition apparatus that identifies a three-dimensional object.

Japanese Patent No. 3349060 discloses a technique that includes detecting a preceding vehicle in front of an own vehicle to reduce an influence of contact with the preceding vehicle and a technique that includes making a following control to keep a safe distance from the preceding vehicle.

SUMMARY

An aspect of the technology provides a vehicle external environment recognition apparatus to be applied to a vehicle. The vehicle external environment recognition apparatus includes a position calculation processor, a three-dimensional object determination processor, an identification object identifying processor, and a vehicle tracking processor. The position calculation processor is configured to calculate three-dimensional positions of respective blocks in a captured image. The three-dimensional object determination processor is configured to group the blocks to put any two or more of the blocks that have the three-dimensional positions differing from each other within a predetermined range in a group and thereby determine three-dimensional objects. The identification object identifying processor is configured to identify a preceding vehicle relative to the vehicle and a sidewall on the basis of the three-dimensional objects. The vehicle tracking processor is configured to estimate a future position of the preceding vehicle to track the preceding vehicle. The vehicle tracking processor is configured to determine whether or not the preceding vehicle identified by the identification object identifying processor corresponds to a portion of the sidewall.

An aspect of the technology provides a vehicle external environment recognition apparatus to be applied to a vehicle. The vehicle external environment recognition apparatus includes circuitry. The circuitry is configured to calculate three-dimensional positions of respective blocks in a captured image. The circuitry is configured to group the blocks to put any two or more of the blocks that have the three-dimensional positions differing from each other within a predetermined range in a group and thereby determine three-dimensional objects. The circuitry is configured to identify a preceding vehicle relative to the vehicle and a sidewall on the basis of the three-dimensional objects. The circuitry is configured to estimate a future position of the preceding vehicle to track the preceding vehicle. The circuitry is configured to determine whether or not the preceding vehicle identified corresponds to a portion of the sidewall.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In order to reduce an influence of contact between an own vehicle and a preceding vehicle, or in order to make a following control to the preceding vehicle, the own vehicle may first determine a three-dimensional object present in a traveling direction and determine whether the three-dimensional object is an identification object such as a preceding vehicle. Further, the own vehicle may track the identified preceding vehicle to perform various controls related to the preceding vehicle.

For example, on a toll road, a sidewall having the same continuous appearance may sometimes extend along the road. In a case where an own vehicle travels along a curve on such a road, there may be cases where the appearance of the sidewall on the inner side of the curve located at a distance does not change. This may possibly cause the own vehicle to misrecognize a portion of such a sidewall as a preceding vehicle having the same speed as the own vehicle.

It is desirable to provide a vehicle external environment recognition apparatus that makes it possible to reduce mistakes in recognizing a preceding vehicle to track.

Some example embodiments of the technology will now be described in detail with reference to the accompanying drawings. Note that sizes, materials, specific values, and any other factors illustrated in respective example embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals without any redundant description. Further, elements that are not directly related to the technology are not illustrated in the drawings. The drawings are schematic and are not intended to be drawn to scale.

[Vehicle External Environment Recognition System 100]

Figure 1:
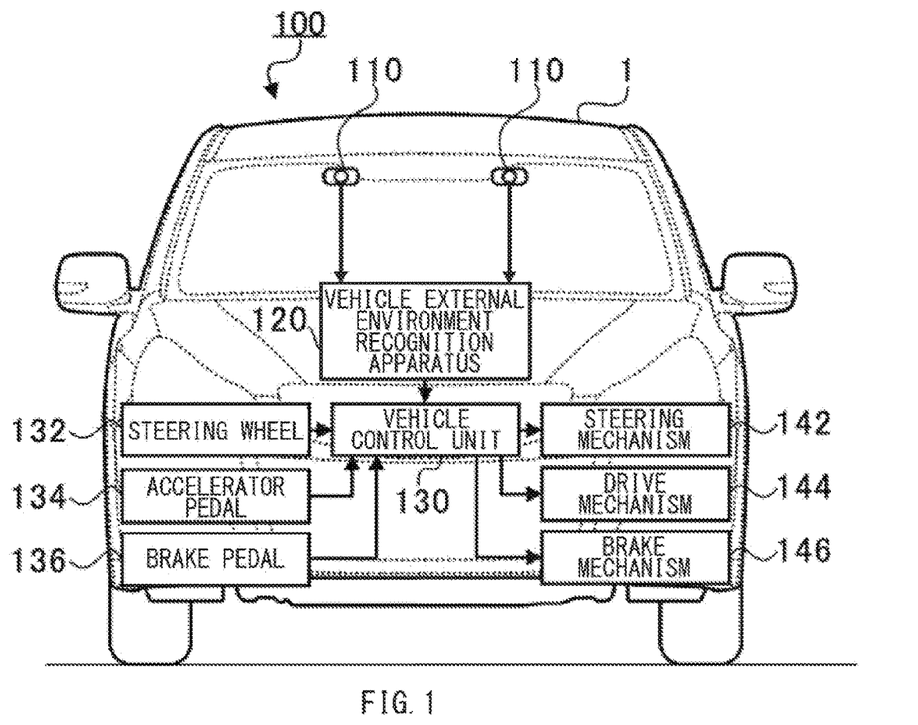
FIG. 1 is a block diagram illustrating an example of a coupling relationship in a vehicle external environment recognition system.

FIG. 1 is a block diagram illustrating a coupling relationship in a vehicle external environment recognition system 100. The vehicle external environment recognition system 100 may be provided in an own vehicle 1. The vehicle external environment recognition system 100 may include, for example but not limited to, imaging units 110, a vehicle external environment recognition apparatus 120, and a vehicle control unit 130.

The imaging units 110 may each include an imaging device such as a charge-coupled device (CCD) or a complementary metal-oxide semiconductor (CMOS). For example, two imaging units 110 may be disposed to be away from each other in a substantially horizontal direction in such a manner that optical axes of the respective imaging units 110 are substantially parallel to each other and are each parallel to a traveling direction of the own vehicle 1. The imaging units 110 may each perform imaging of an external environment in front of the own vehicle 1, and generate a luminance image that includes at least luminance information. The luminance image may be a color image or a monochrome image. The imaging units 110 may each continuously generate the luminance images of three-dimensional objects present in a detection region in front of the own vehicle 1 for each frame of 1/60 seconds, i.e., at a frame rate of 60 fps, for example. Non-limiting examples of the three-dimensional object and an identification object to be recognized by the vehicle external environment recognition apparatus 120 may include an independently present object and an object identifiable as a portion of the independently present object. Non-limiting examples of the independently present object may include a bicycle, a pedestrian, a vehicle, a traffic light, a road sign, a guardrail, a building, and a sidewall at the roadside. Non-limiting examples of the object identifiable as a portion of the independently present object may include a rear surface of a vehicle, a side surface of a vehicle, and a wheel of a bicycle. As used herein, the "rear surface of a vehicle" refers to a surface, of another vehicle in front of the own vehicle 1, opposed to the own vehicle 1 and does not refer to a back surface of the relevant vehicle itself.

The vehicle external environment recognition apparatus 120 may acquire the luminance images from the two respective imaging units 110, and generate distance images by so-called pattern matching. The vehicle external environment recognition apparatus 120 may group blocks on the basis of the luminance images and the distance images. The vehicle external environment recognition apparatus 120 may put any two or more blocks that are located above a road surface, have the same color value, and have respective pieces of three-dimensional position information that are adjacent to each other in a group as a three-dimensional object. Further, the vehicle external environment recognition apparatus 120 may determine which kind of identification object the three-dimensional object is. For example, the vehicle external environment recognition apparatus 120 may identify the three-dimensional object as a preceding vehicle. Upon identifying the preceding vehicle, the vehicle external environment recognition apparatus 120 may perform a control of reducing an influence of contact between the own vehicle 1 and the preceding vehicle, or may perform a following control of causing the own vehicle 1 to follow the preceding vehicle. Examples of operation of the vehicle external environment recognition apparatus 120 will be described later in detail.

The vehicle control unit 130 may include, for example but not limited to, an electronic control unit (ECU). The vehicle control unit 130 may receive input of operation performed by an occupant such as a driver via devices including, without limitation, a steering wheel 132, an accelerator pedal 134, and a brake pedal 136, and transmit the information of the input to mechanisms including, without limitation, a steering mechanism 142, a drive mechanism 144, and a brake mechanism 146, thereby controlling the own vehicle 1. Further, the vehicle control unit 130 may control each of the steering mechanism 142, the drive mechanism 144, and the brake mechanism 146 in accordance with an instruction given by the vehicle external environment recognition apparatus 120.

[Vehicle External Environment Recognition Apparatus 120]

Figure 2:
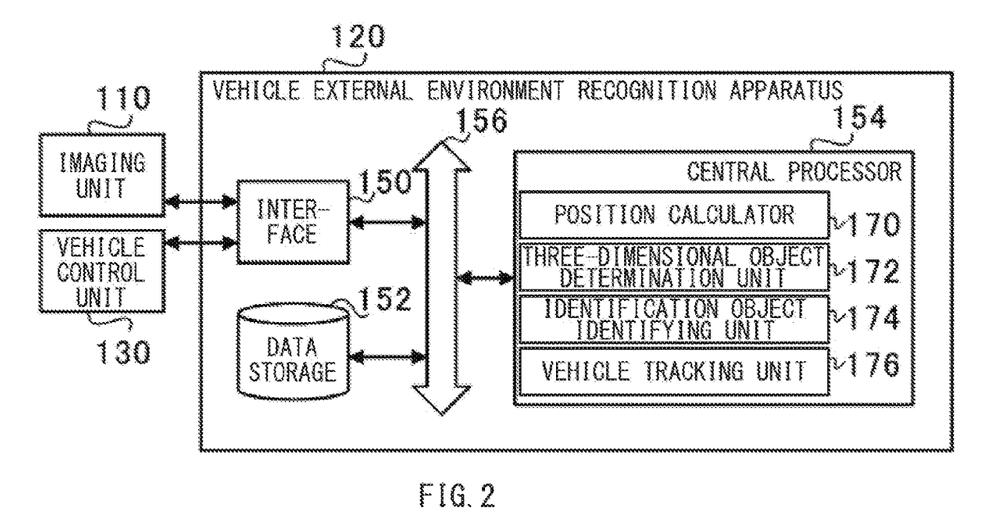
FIG. 2 is a block diagram illustrating an example of a schematic configuration of a vehicle external environment recognition apparatus.

FIG. 2 is a block diagram illustrating an example of a schematic configuration of the vehicle external environment recognition apparatus 120. As illustrated in FIG. 2, the vehicle external environment recognition apparatus 120 may include an interface 150, a data storage 152, and a central processor 154.

The interface 150 may allow for bi-directional information exchange between the vehicle external environment recognition apparatus 120 and each of the imaging unit 110 and the vehicle control unit 130. The data storage 152 may include a device such as a random-access memory (RAM), a flash memory, or a hard disk drive (HDD). The data storage 152 may store various pieces of information necessary for processing to be performed by the units described below.

The central processor 154 may include a semiconductor integrated circuit including, for example, a central processing unit (CPU), a read only memory (ROM), and a RAM. The ROM may store information such as a program. The RAM may serve as a work area. The central processor 154 may control the unit such as the interface 150 or the data storage 152 via a system bus 156. In the example embodiment, the central processor 154 may also serve as a position calculator 170, a three-dimensional object determination unit 172, an identification object identifying unit 174, and a vehicle tracking unit 176. In the following, a vehicle external environment recognition method is described in detail also with reference to operation of each unit of the central processor 154.

[Vehicle External Environment Recognition Method]

Figure 3:
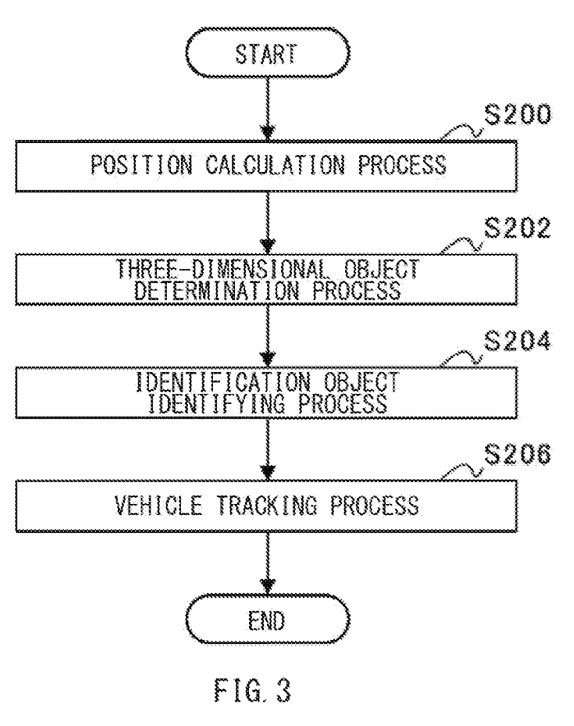
FIG. 3 is a flowchart illustrating an example of a flow of processes in a vehicle external environment recognition method.

FIG. 3 is a flowchart illustrating a flow of processes in the vehicle external environment recognition method. The vehicle external environment recognition apparatus 120 may execute the processes in the vehicle external environment recognition method every predetermined interruption time. In the vehicle external environment recognition method, the position calculator 170 may calculate three-dimensional positions of respective blocks in the luminance images acquired from the imaging units 110 (position calculation process S200). The three-dimensional object determination unit 172 may group the blocks to determine three-dimensional objects (three-dimensional object determination process S202). The identification object identifying unit 174 may identify a preceding vehicle and a sidewall on the basis of the three-dimensional objects (identification object identifying process S204). The vehicle tracking unit 176 may estimate a future position of the preceding vehicle to track the preceding vehicle (vehicle tracking process S206).

[Position Calculation Process S200]

Figure 4A:
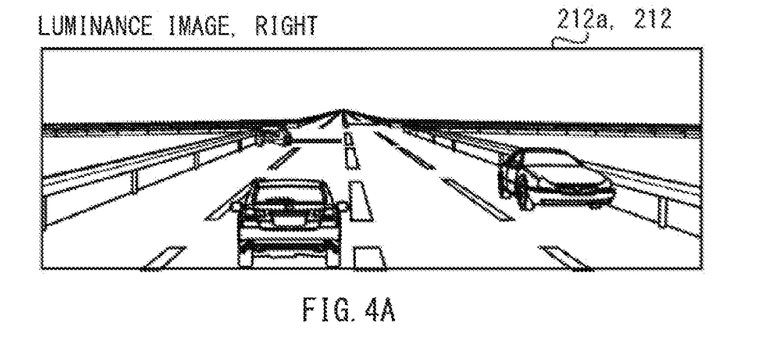
FIGS. 4A to 4C are explanatory diagrams for describing examples of a luminance image and a distance image.
Figure 4B:
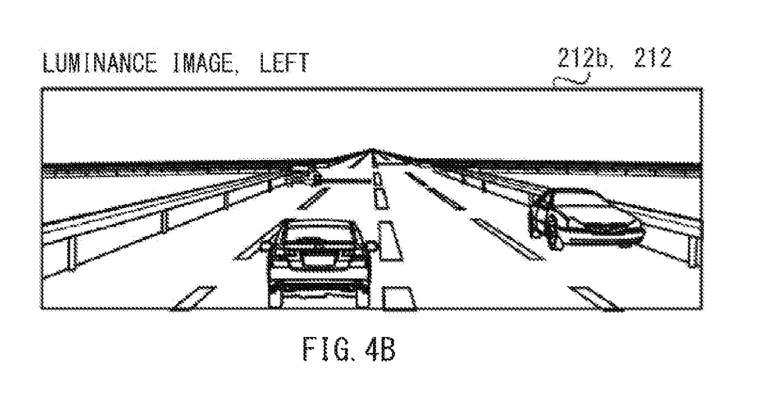
Figure 4C:
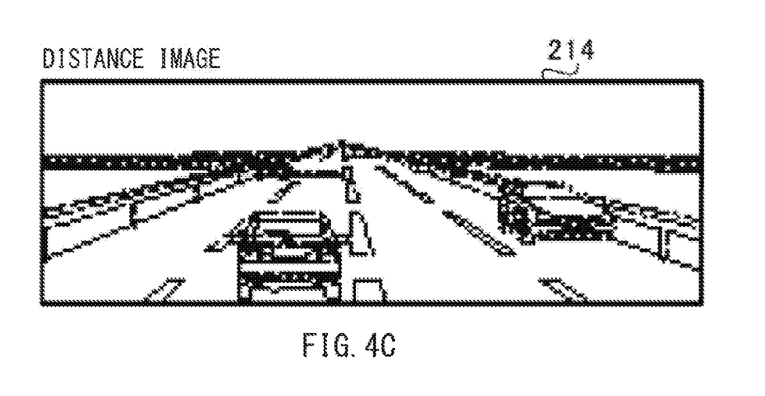

FIGS. 4A to 4C are explanatory diagrams for describing the luminance image and the distance image. The position calculator 170 may acquire two or more luminance images that have been captured by the respective imaging units 110 at substantially the same timing with different optical axes. In this example, the position calculator 170 may acquire two luminance images. Assume that the position calculator 170 acquires a first luminance image 212a illustrated in FIG. 4A and a second luminance image 212b illustrated in FIG. 4B as the luminance images 212. The first luminance image 212a may be captured by the imaging unit 110 positioned relatively on the right side of the own vehicle 1. The second luminance image 212b may be captured by the imaging unit 110 positioned relatively on the left side of the own vehicle 1.

Referring to FIGS. 4A and 4B, an image position of the three-dimensional object included in the first luminance image 212a and an image position of the three-dimensional object included in the second luminance image 212b may be different from each other in a horizontal direction because of a difference in imaging position between the imaging units 110. As used herein, the term "horizontal" refers to a lateral direction of the captured image, and the term "vertical" refers to a longitudinal direction of the captured image.

The position calculator 170 may generate a distance image 214 as illustrated in FIG. 4C on the basis of the first luminance image 212a illustrated in FIG. 4A and the second luminance image 212b illustrated in FIG. 4B. The first luminance image 212a and the second luminance image 212b may be acquired by the position calculator 170. The distance image 214 may allow for determination of a distance from the own vehicle 1 to a captured object.

For example, the position calculator 170 may calculate parallax information including a parallax and an image position by so-called pattern matching. The image position may indicate a position of any block in the image. Further, the position calculator 170 may extract any block from one of the luminance images, e.g., the first luminance image 212a in this example, and search another of the luminance images, e.g., the second luminance image 212b, for a corresponding block to the block extracted. A block may include, for example but not limited to, an array of four pixels horizontally by four pixels vertically. The pattern matching is a method to search one of the luminance images for a block corresponding to any block extracted from another of the luminance images.

Non-limiting examples of a function for evaluating a matching level between blocks in pattern matching may include the sum of absolute differences (SAD) that obtains luminance differences, the sum of squared intensity differences (SSD) that uses squared differences, and the normalized cross correlation (NCC) that obtains similarity of variance obtained by subtracting an average luminance value from the luminance value of each pixel.

The position calculator 170 may perform such a block-based parallax calculation process, for example, for all of the blocks present in the detection region of 600 pixels by 200 pixels. In this example, the position calculator 170 may perform the process on the basis of a block of four pixels by four pixels; however, this is non-limiting. The position calculator 170 may perform the process for any number of pixels.

The position calculator 170 may convert the parallax information for each block in the distance image 214 into a three-dimensional position in real space including a horizontal distance x, a height y and a relative distance z by a so-called stereo method. The stereo method may be a method of calculating the relative distance z of any block with respect to the imaging unit 110 on the basis of a parallax of the block in the distance image 214 by a triangulation method. The position calculator 170 may calculate the height y of the block from a road surface on the basis of: the relative distance z of the block; and a detection distance in the distance image 214 from the block to a point on the road surface having the same relative distance z as the block. Further, the position calculator 170 may associate the calculated three-dimensional position with the distance image 214. The process of calculating the relative distance z and the process of determining the three-dimensional position may use any of various publicly known techniques, and is therefore not described further here.

[Three-dimensional Object Determination Process S202]

The three-dimensional object determination unit 172 may group the blocks in such a manner as to put any two or more blocks that are located above a road surface, have the same color value, and have three-dimensional positions on the distance image 214 differing from each other within a predetermined range in a group, and thereby determine three-dimensional objects. For example, the three-dimensional object determination unit 172 may group the blocks assuming that any two or more blocks that have horizontal distances x differing from each other within a predetermined range, heights y differing from each other within a predetermined range, and relative distances z differing from each other within a predetermined range belong to the identical identification object. The predetermined range may be, for example but not limited to, 0.1 m. Thus, the three-dimensional object determination unit 172 may generate virtual block groups.

Figure 5A:
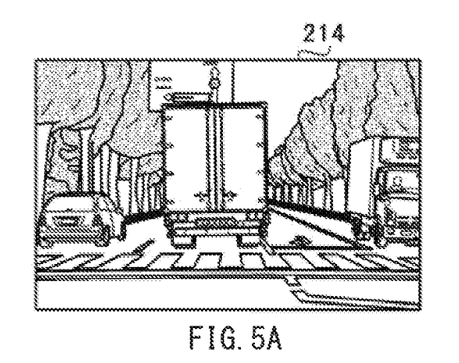
FIGS. 5A to 5C are explanatory diagrams for describing an example of operation of a three-dimensional object determination unit.
Figure 5B:
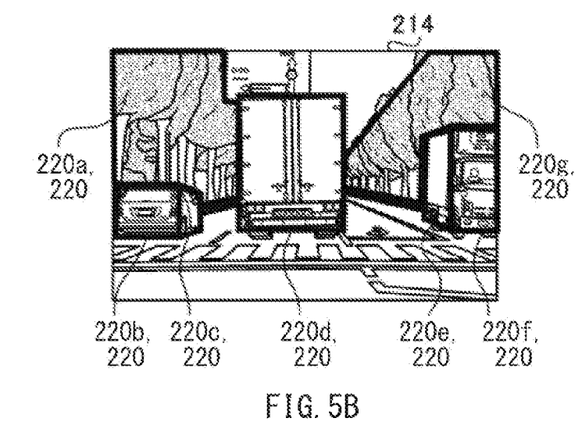

FIGS. 5A to 5C are explanatory diagrams for describing operation of the three-dimensional object determination unit 172. Now, assume an example case where the position calculator 170 has generated the distance image 214 as illustrated in FIG. 5A. The three-dimensional object determination unit 172 may group the blocks on the basis of such a distance image 214. As a result, block groups based on such grouping may be extracted as illustrated in FIG. 5B. The three-dimensional object determination unit 172 may set an outline including all of the blocks in the group as a three-dimensional object 220 in FIG. 5B. For example, the three-dimensional object determination unit 172 may set a rectangular frame or a rectangular surface formed by horizontal lines and vertical lines, or by lines extending in a depthwise direction and vertical lines as a three-dimensional object 220. Thus, the three-dimensional object determination unit 172 may determine three-dimensional objects 220a, 220b, 220c, 220d, 220e, 22f, and 220g illustrated in FIG. 5B.

Figure 5C:
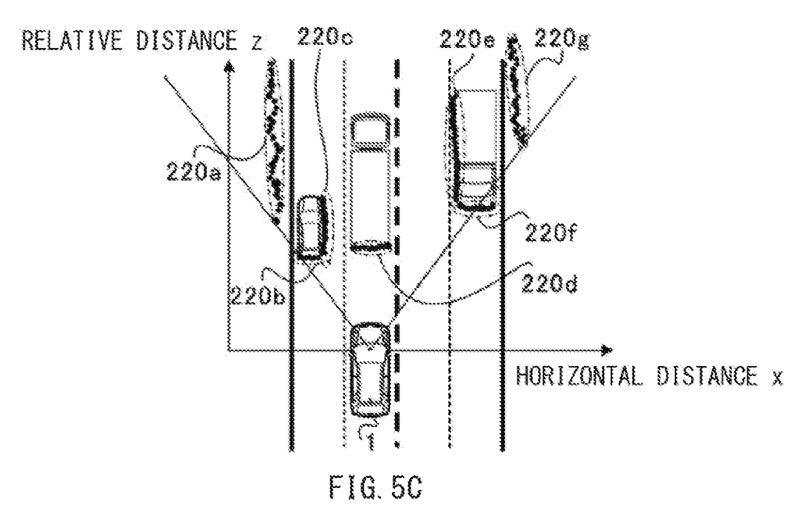

The three-dimensional objects 220a, 220b, 220c, 220d, 220e, 220f, and 220g in the distance image 214 in FIG. 5B may be translated onto a two-dimensional horizontal plane represented by the horizontal distance x and the relative distance z as the three-dimensional objects 220a, 220b, 220c, 220d, 220e, 220f, and 220g illustrated in FIG. 5C.

[Identification Object Identifying Process S204]

The identification object identifying unit 174 may determine which identification object the three-dimensional object determined by the three-dimensional object determination unit 172 is. For example, the identification object identifying unit 174 may identify the three-dimensional object that is traveling in substantially the same direction as the own vehicle 1 in front of the own vehicle 1 as a preceding vehicle.

For example, the three-dimensional object determination unit 172 may determine the three-dimensional object 220b and the three-dimensional object 220c as different three-dimensional objects in FIG. 5C. However, in fact, the three-dimensional object 220b corresponds to a rear surface of the preceding vehicle and the three-dimensional object 220c corresponds to a side surface of the preceding vehicle. Therefore, the three-dimensional object 220b and the three-dimensional object 220c should be recognized as a pair of portions included in the one identical three-dimensional object. Similarly, the three-dimensional object 220e and the three-dimensional object 220f should be recognized as the identical three-dimensional object. Accordingly, the identification object identifying unit 174 may pair the three-dimensional objects 220 which are the rear surface and the side surface of the identical three-dimensional object.

Figure 6A:
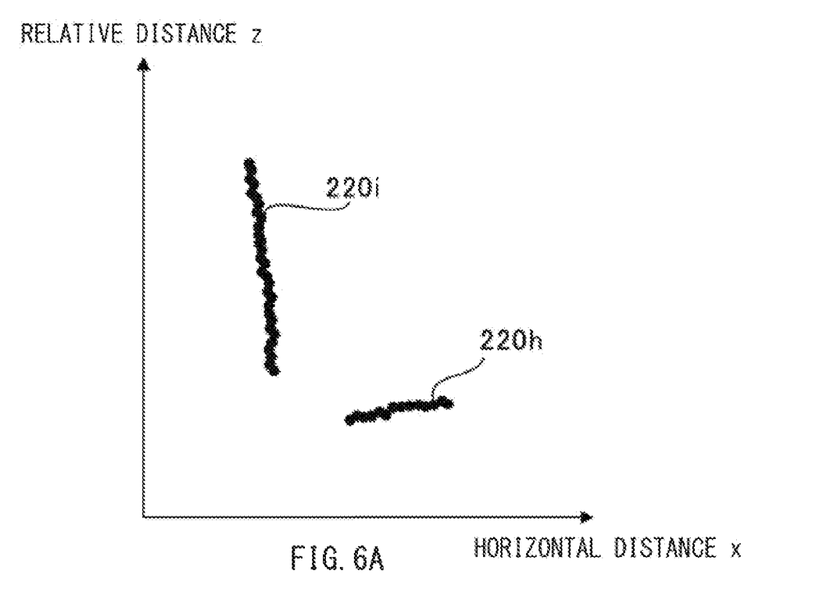
FIGS. 6A and 6B are explanatory diagrams for describing an example of operation of an identification object identifying unit.
Figure 6B:
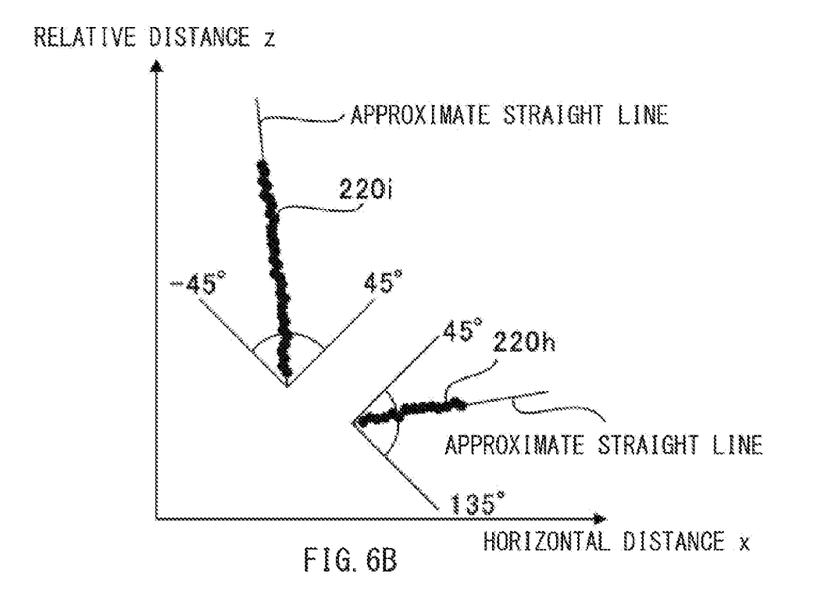

FIGS. 6A and 6B are explanatory diagrams for describing operation of the identification object identifying unit 174. FIGS. 6A and 6B are each projection of the three-dimensional objects 220 on a horizontal plane and represented only by the horizontal distance x and the relative distance z.

The identification object identifying unit 174 may project the three-dimensional objects 220 onto the horizontal plane and distinguish between the rear surface and the side surface on the basis of angles with respect to the depthwise direction. If a relationship between the rear surface and the side surface satisfies a predetermined condition, the identification object identifying unit 174 may pair the rear surface and the side surface to identify a pair.

For example, first, the identification object identifying unit 174 may calculate an angle of an approximate straight line of the three-dimensional object 220 with respect to an axis of the relative distance corresponding to the depthwise direction. If an absolute value of the calculated angle falls within a range that is greater than or equal to 45 degrees and less than 135 degrees, the identification object identifying unit 174 may identify the three-dimensional object 220 as the rear surface. If the absolute value of the calculated angle falls within a range that is greater than or equal to 0 (zero) degrees and less than 45 degrees or within a range that is greater than or equal to 135 degrees and less than or equal to 180 degrees, the identification object identifying unit 174 may identify the three-dimensional object 220 as the side surface.

For example, assume a case where the three-dimensional object determination unit 172 has determined three-dimensional objects 220h and 220i as illustrated in FIG. 6A as a result of grouping. In such an example case, the absolute value of the angle of the approximate straight line of the three-dimensional object 220h falls within the range that is greater than or equal to 45 degrees and less than 135 degrees, as illustrated in FIG. 6B. Therefore, the identification object identifying unit 174 may identify the three-dimensional object 220h as the rear surface. The absolute value of the angle of the approximate straight line of the three-dimensional object 220i falls within the range that is greater than or equal to 0 (zero) degrees and less than 45 degrees. Therefore, the identification object identifying unit 174 may identify the three-dimensional object 220i as the side surface. The identification object identifying unit 174 may be able to roughly distinguish between the rear surface and the side surface in such a manner.

In one example, the identification object identifying unit 174 may pair the rear surface and the side surface in a case: where a distance from the rear surface to the side surface falls within a range that is appropriate for portions of the same vehicle, for example, 2 meters; where the speed of the rear surface and the speed of the side surface are both stable; where the rear surface and the side surface both have lengths each of which is greater than or equal to a predetermined value, for example, 1 meter; and where a position of the middle of the rear surface and the side surface is present within the detection region. Such additional conditions for pairing may allow the identification object identifying unit 174 to appropriately limit the target of the pairing, which helps to reduce a process load.

For example, the identification object identifying unit 174 may determine whether the pair of the three-dimensional object 220h corresponding to the rear surface and the three-dimensional object 220i corresponding to the side surface satisfies a condition for a preceding vehicle. For example, the identification object identifying unit 174 may determine whether the three-dimensional object including the pair of the three-dimensional object 220h and the three-dimensional object 220i has a size appropriate as a vehicle, a shape appropriate as a vehicle, a relative speed appropriate as a vehicle, and a light emission source provided at a predetermined position on the rear side. Non-limiting examples of the light emission source may include a brake lamp and a high mount stop lamp. In a case where such a condition is satisfied, the identification object identifying unit 174 may identify the three-dimensional object 220 including the pair of the three-dimensional object 220h and the three-dimensional object 220i as the preceding vehicle.

In one example, the identification object identifying unit 174 may identify the three-dimensional object 220 as the preceding vehicle on the basis of a result of estimation performed by the later-described vehicle tracking unit 176 in a previous frame. For example, the identification object identifying unit 174 may identify the three-dimensional object 220 as the preceding vehicle if a difference between the position of the three-dimensional object determined by the three-dimensional object determination unit 172 and the position of the three-dimensional object 220 estimated by the vehicle tracking unit 176 falls within a predetermined range.

Further, the identification object identifying unit 174 may identify a three-dimensional object that stands on the side of the road in front of the own vehicle 1 as a sidewall.

For example, referring to FIG. 5C, the identification object identifying unit 174 may identify the three-dimensional object 220a that stands on the left side of the road as a left sidewall. Further, the identification object identifying unit 174 may identify the three-dimensional object 220g that stands on the right side of the road as a right sidewall.

In one example, the identification object identifying unit 174 may determine each of the three-dimensional objects 220a and 220g as a sidewall in a case: where each of the three-dimensional objects 220a and 220g has a relative speed substantially the same as the speed of the own vehicle 1; where each of the three-dimensional objects 220a and 220g has a horizontal distance and a vertical distance from a road that stably fall within respective predetermined ranges; and where each of the three-dimensional objects 220a and 220g is continuous in the depthwise direction.

In a case where the identification object identifying unit 174 identifies the three-dimensional object 220 as the sidewall, the identification object identifying unit 174 may calculate, for example, an approximate curve line based on the least-squares method for the blocks belonging to the three-dimensional object 220. The identification object identifying unit 174 may associate the calculated approximate curve line with the three-dimensional object 220 as a trajectory of the side surface on the horizontal plane.

[Vehicle Tracking Process S206]

The vehicle tracking unit 176 may estimate a future position of the preceding vehicle identified by the identification object identifying unit 174, to track the preceding vehicle. As used herein, the term "track" refers to determining whether the preceding vehicles identified in the respective frames are identical and calculating transition of movement over time of the preceding vehicles that are determined as being identical to thereby perform time-series management of the preceding vehicle.

Figure 7A:
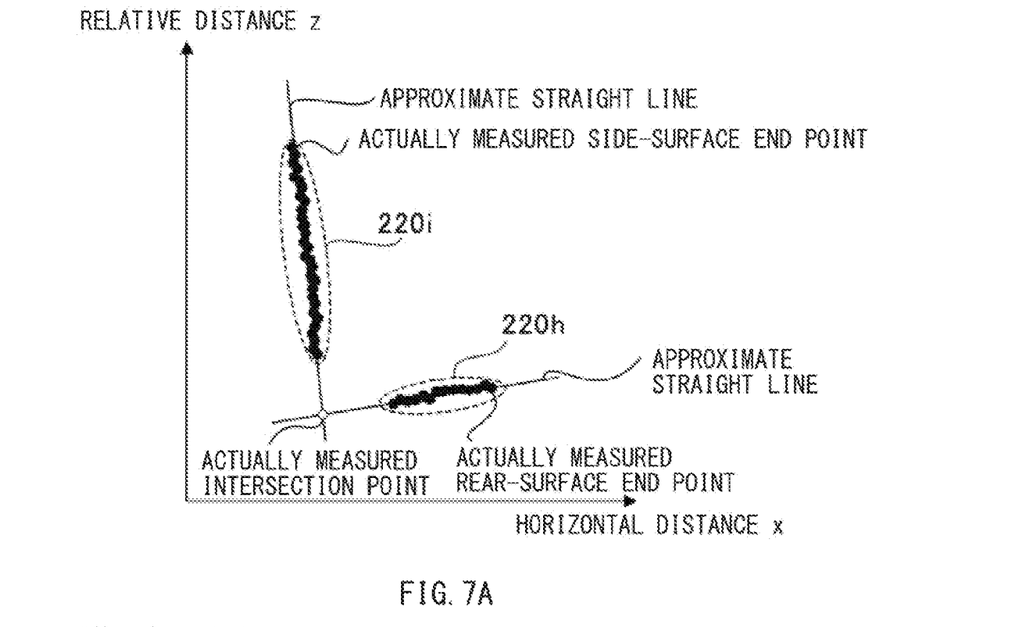
FIGS. 7A and 7B are explanatory diagrams for describing an example of operation of a vehicle tracking unit.
Figure 7B:
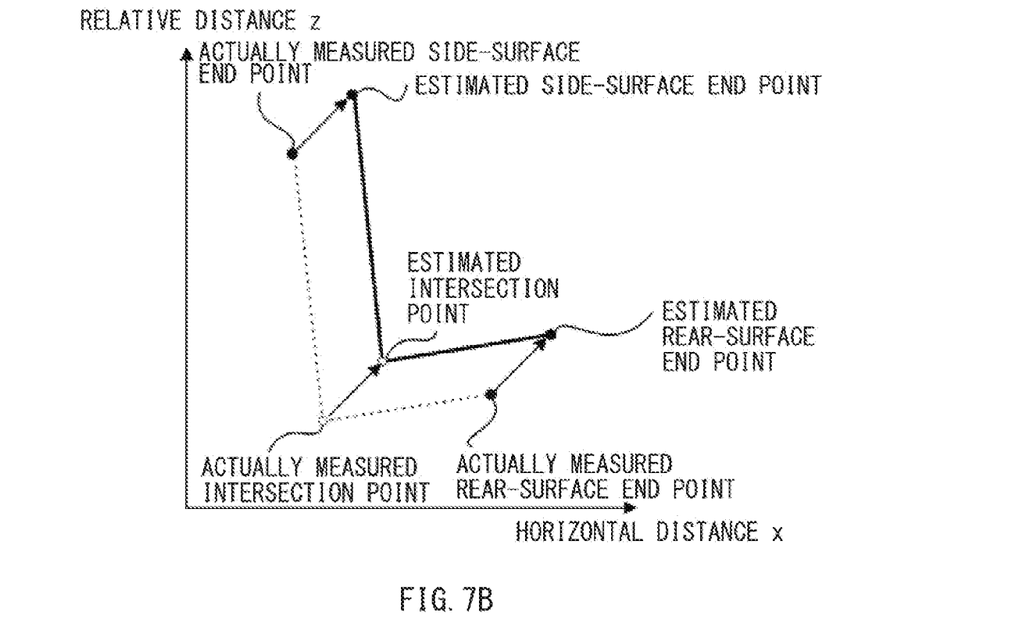

FIGS. 7A and 7B are explanatory diagrams for describing operation of the vehicle tracking unit 176. The diagrams illustrated in FIGS. 7A and 7B are represented only by the horizontal distance x and the relative distance z. For example, assume a case where the three-dimensional object determination unit 172 has determined the three-dimensional objects 220h and 220i as illustrated in FIG. 7A. Further, assume that the identification object identifying unit 174 has paired the three-dimensional object 220h and the three-dimensional object 220i as a rear surface and a side surface, respectively, and has identified the pair as a preceding vehicle. Here, an intersection point of an approximate straight line of the blocks belonging to the three-dimensional object 220h and an approximate straight line of the blocks belonging to the three-dimensional object 220i may be set as an actually measured intersection point. Further, a point of a block that belongs to the three-dimensional object 220h and is farthest from the actually measured intersection point may be set as an actually measured rear-surface end point. Further, a point of a block that belongs to the three-dimensional object 220i and is farthest from the actually measured intersection point may be set as an actually measured side-surface end point.

As illustrated in FIG. 7B, the vehicle tracking unit 176 may use the actually measured intersection point, the actually measured rear-surface end point, and the actually measured side-surface end point as well as actually measured intersection points, actually measured rear-surface end points, and actually measured side-surface end points that have been calculated in the past for a plurality of times to calculate a next estimated intersection point, a next estimated rear-surface end point, and a next estimated side-surface end point by a method such as Kalman filtering. On this occasion, the vehicle tracking unit 176 may estimate the next estimated intersection point, the next estimated rear-surface end point, and the next estimated side-surface end point, taking into consideration the relative speed, an angular velocity about the Y-axis, and ego-motion of each of the rear surface and the side surface. Further, the vehicle tracking unit 176 may store the result of estimation, i.e., the estimated intersection point, the estimated rear-surface end point, and the estimated side-surface end point, of the current frame in the data storage 152 for the next frame. It is to be noted that, although the vehicle tracking unit 176 may estimate the transition of the movement of the preceding vehicle on the basis of the points including the end points and the intersection point of the preceding vehicle in this example, this is non-limiting, and the vehicle tracking unit 176 may use any of a variety of existing techniques to estimate the transition of the movement.

Thereafter, the vehicle tracking unit 176 may read the result of the estimation in the previous frame from the data storage 152. The vehicle tracking unit 176 may compare the result of the actual measurement in the current frame including the actually measured intersection point, the actually measured rear-surface end point, and the actually measured side-surface end point with the result of the estimation in the previous frame to determine the identity of the three-dimensional objects. For example, the vehicle tracking unit 176 may identify the result of the actual measurement in the current frame that has the shortest distance from the result of the estimation in the previous frame and differs in size of the three-dimensional object therefrom within a predetermined range. In a case where a difference in three-dimensional position between the identified result of the actual measurement in the current frame and the result of the estimation in the previous frame falls within a predetermined range, the vehicle tracking unit 176 may determine that the preceding vehicles in the respective frames are the identical preceding vehicle. In such a manner, the vehicle tracking unit 176 may be able to calculate the transition of the movement of the preceding vehicle to track in respective frames.

After the vehicle tracking unit 176 calculates the transition of the movement of the preceding vehicle to track, the vehicle external environment recognition apparatus 120 may use the calculated transition of the movement of the preceding vehicle to perform a control of reducing an influence of contact between the own vehicle 1 and the preceding vehicle, or to perform a following control of causing the own vehicle 1 to follow the preceding vehicle.

For example, on a road such as a toll road, vehicles rarely pass through intersections. On such a road, a sidewall having the same continuous appearance may sometimes extend along the road. In a case where the own vehicle 1 travels along a curve on such a road, there may be cases where the appearance of the sidewall on the inner side of the curve located at a distance does not change. This may possibly cause the identification object identifying unit 174 to misrecognize a portion of such a sidewall as a preceding vehicle having the same speed as the own vehicle 1. In the following, such a phenomenon is described in detail.

Figure 8A:
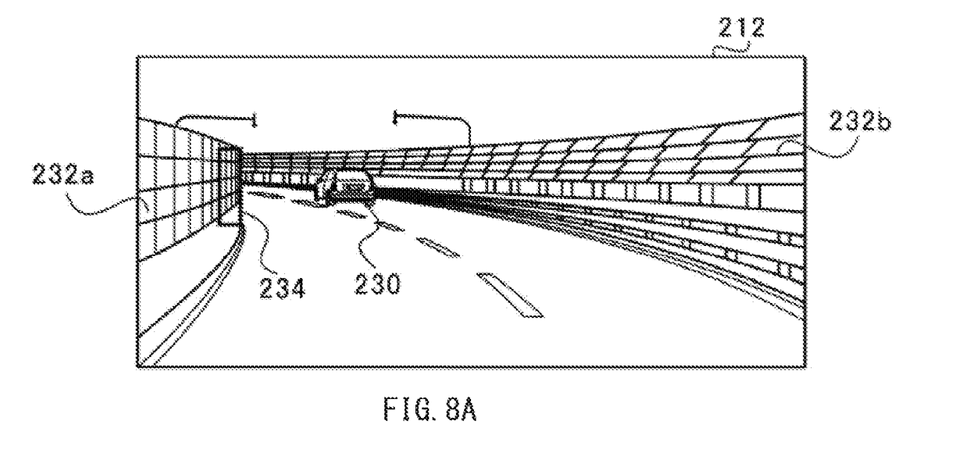
FIGS. 8A and 8B are explanatory diagrams for describing an example of travel of an own vehicle.
Figure 8B:
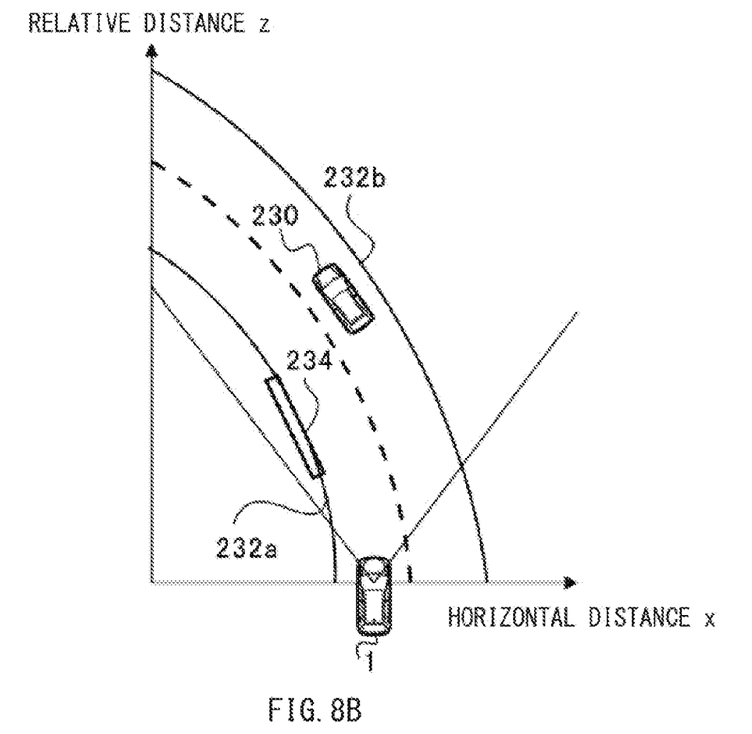

FIGS. 8A and 8B are explanatory diagrams for describing an example of travel of the own vehicle 1. FIG. 8A illustrates the luminance image 212 in a case where the own vehicle 1 is traveling on a curved road. FIG. 8B illustrates a state of the detection region projected onto a horizontal plane. As illustrated in FIG. 8A, the own vehicle 1 is traveling on a road that is curved toward the left. A preceding vehicle 230 is present in front. Sidewalls 232a and 232b are provided upright on the left and right sides of the road.

Accordingly, the identification object identifying unit 174 may identify a three-dimensional object positioned in front, as the preceding vehicle 230. Out of the three-dimensional objects standing at the roadside, the identification object identifying unit 174 may identify a three-dimensional object on the left side of the road as the sidewall 232a and identify a three-dimensional object on the right side of the road as the sidewall 232b.

Let us focus on the sidewall 232a on the inner side of the curve, i.e., on the left side of the curve. In a case where the road is curved leftward, as illustrated in FIG. 8A, in the luminance image 212, the sidewall 232a on the inner side of the road is interrupted at a distance.

As illustrated in FIG. 8A, let us assume that the sidewall 232a continues far with the same appearance of a constant height. In a case where the curve has a constant curvature or a change in curvature is small, the appearance of a portion 234 of the sidewall 232a in the vicinity of a position where the sidewall 232a is interrupted does not change. One reason for this may be as follows. As the own vehicle 1 moves, the sidewall 232a at a distance is sequentially included in the luminance image 212, causing the appearance of the portion 234 in the vicinity of the position where the sidewall 232a is interrupted to be updated without changing. It follows that the identification object identifying unit 174 may identify the portion 234 with the changeless appearance as the same three-dimensional object regardless of changes in a frontward environment of the own vehicle 1 traveling along the curve.

Moreover, although the portion 234 is a portion of the sidewall 232a, the portion 234 is located at a distance. Accordingly, the portion 234 has lowered accuracy of the determination of the three-dimensional position in the distance image 214. This may cause the identification object identifying unit 174 to misrecognize texture of the portion 234 and identify the portion 234 as a back surface and a side surface on the basis of the image of the portion 234. In this case, the identification object identifying unit 174 may identify the portion 234 with the changeless appearance as a preceding vehicle regardless of the changes in the frontward environment of the own vehicle 1 traveling along the curve. The preceding vehicle as used here includes not only a four-wheeled vehicle but also a two-wheeled vehicle.

The vehicle tracking unit 176 may recognize the portion 234 of the sidewall 232a as a preceding vehicle on the basis of the information from the identification object identifying unit 174. As long as the sidewall 23a continues, the vehicle tracking unit 176 may estimate the future position of the preceding vehicle and track the sidewall 232a as the preceding vehicle. Thus, the vehicle external environment recognition apparatus 120 may end up determining that an actually-absent preceding vehicle has entered the travel path, to perform a control of reducing the influence of the contact between the own vehicle 1 and the preceding vehicle, and/or perform a following control to allow the own vehicle 1 to follow the preceding vehicle.

Accordingly, before the vehicle external environment recognition apparatus 120 starts the following control to the preceding vehicle, the vehicle tracking unit 176 may determine whether or not the preceding vehicle actually corresponds to a portion of the sidewall 232a. In fact, the preceding vehicle is the portion 234 of the sidewall 232a but has been identified as a preceding vehicle by the identification object identifying unit 174.

Figure 9:
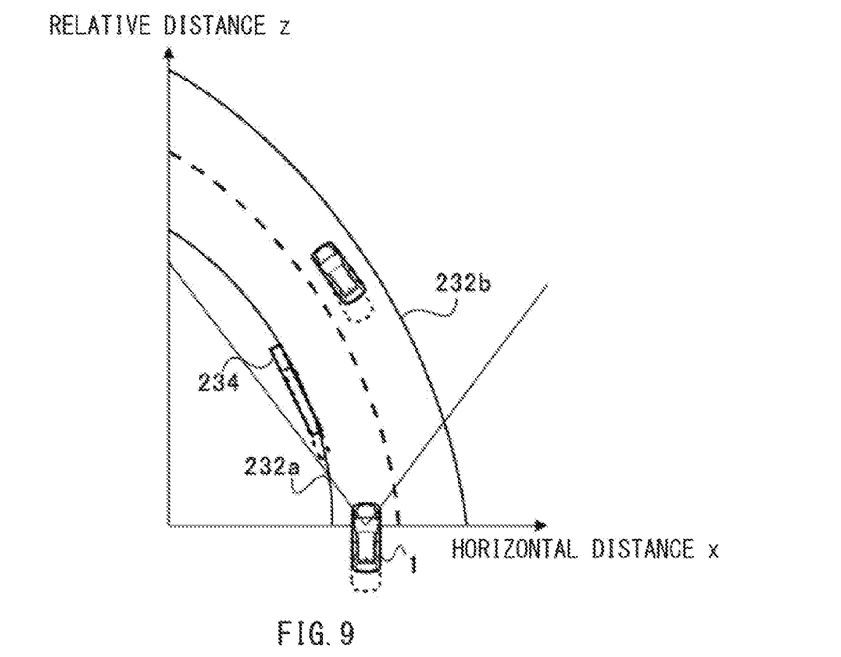
FIG. 9 is an explanatory diagram for describing an example of the operation of the vehicle tracking unit.
Figure 10:
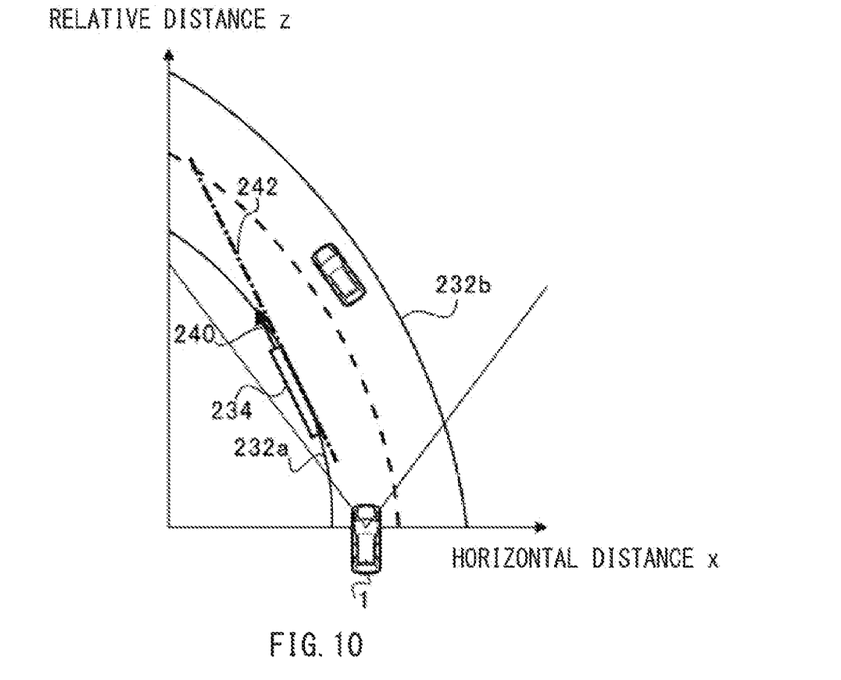
FIG. 10 is an explanatory diagram for describing an example of the operation of the vehicle tracing unit.
Figure 11:
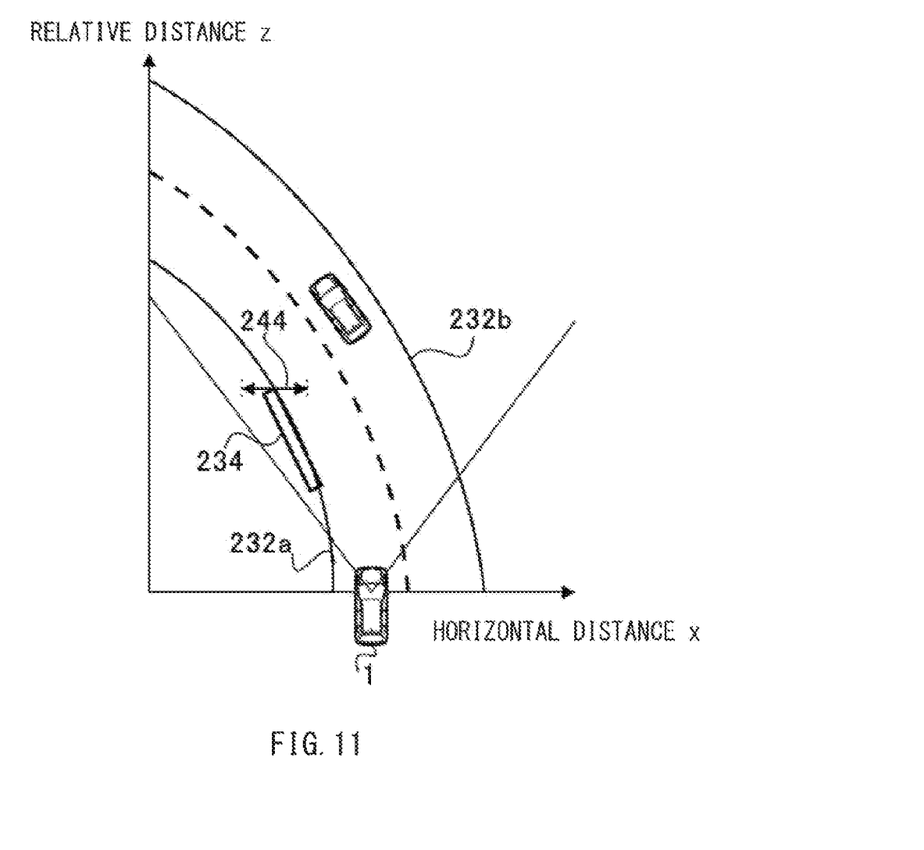
FIG. 11 is an explanatory diagram for describing an example of the operation of the vehicle tracking unit.

FIGS. 9 to 11 are explanatory diagrams illustrating the operation of the vehicle tracking unit 176. As described above, with the movement of the own vehicle 1, the sidewall 232a at a distance is sequentially included in the luminance image 212, causing the appearance of the portion 234 in the vicinity of the position where the sidewall 232a is interrupted to be updated without changing. Accordingly, a relative distance and a relative speed between the own vehicle 1 and the portion 234 become constant.

Thus, as illustrated in FIG. 9, in a case where the relative speed between the preceding vehicle and the own vehicle 1 is regarded as zero (0), the vehicle tracking unit 176 may determine that the preceding vehicle corresponds to a portion of the sidewall 232a. In fact, the preceding vehicle is the portion 234 of the sidewall 232a. In one example, in a case where the relative speed of the preceding vehicle falls within a predetermined speed range around zero (0), e.g., a range of ±10 km/h, the vehicle tracking unit 176 may regard the relative speed as zero (0). With such a configuration, it is possible for the vehicle tracking unit 176 to appropriately determine that the portion 234 recognized as the preceding vehicle corresponds to a portion of the sidewall 232a. It is to be noted that at this stage, the following control has not been started yet, and this determination is not targeted at an actually-present preceding vehicle which the own vehicle 1 is following.

The portion 234 of the sidewall 232a is updated with the sidewall 232a at a distance sequentially included in the luminance image 212. Moreover, the portion 234 of the sidewall 232a corresponds to a right end of the sidewall 232a which is visible from the own vehicle 1. It follows that a direction in which the portion 234 is updated, i.e., a speed vector of the preceding vehicle, becomes a tangential line to the sidewall 232a at a depthwise position of the portion 234 in a case where the sidewall 232a is considered as a curve.

Thus, as illustrated in FIG. 10, in a case where an angle formed by a speed vector 240 of the preceding vehicle and a tangential line 242 to the sidewall 232a at the depthwise position of the preceding vehicle is regarded as zero (0), the vehicle tracking unit 176 may determine that the preceding vehicle corresponds to a portion of the sidewall 232a. In fact, the preceding vehicle is the portion 234 of the sidewall 232a. In one example, in a case where the angle formed by the speed vector 240 of the preceding vehicle and the tangential line 242 falls within a predetermined angle range around zero (0), e.g., a range of ±5°, the vehicle tracking unit 176 may regard the angle as zero (0). It is to be noted that the depthwise position of the preceding vehicle indicates a depthwise position of the right end of the sidewall 232a. With such a configuration, it is possible for the vehicle tracking unit 176 to appropriately determine that the portion 234 recognized as the preceding vehicle corresponds to a portion of the sidewall 232a.

Moreover, the portion 234 of the sidewall 232a is the sidewall 232a itself. Accordingly, a horizontal position of the portion 234 and a horizontal position of the sidewall 232a are supposed to coincide with each other.

Thus, as illustrated in FIG. 11, in a case where a horizontal distance from the preceding vehicle to the sidewall 232a is regarded as zero (0), the vehicle tracking unit 176 may determine that the preceding vehicle corresponds to a portion of the sidewall 232a. In fact, the preceding vehicle is the portion 234 of the sidewall 232a. In one example, the vehicle tracking unit 176 may determine that the preceding vehicle corresponds to a portion of the sidewall 232a in a case where a horizontal distance from the preceding vehicle to the right end of the sidewall 232a which is visible from the own vehicle 1 falls within a predetermined distance range 244 around zero (0), e.g., a range of ±500 mm. With such a configuration, it is possible for the vehicle tracking unit 176 to appropriately determine that the portion 234 recognized as the preceding vehicle corresponds to a portion of the sidewall 232a.

However, in a case where the conditions described with reference to FIGS. 9 to 11 are satisfied, when the vehicle tracking unit 176 immediately determines that the preceding vehicle corresponds to a portion of the sidewall 232a, the following concern may arise. For example, if noise causes the vehicle tracking unit 176 to determine that an actually-present preceding vehicle is the sidewall 232a, there may be a failure in following the preceding vehicle. Moreover, chattering may cause instability in the following control. Accordingly, the vehicle tracking unit 176 may determine, at predetermined intervals, whether or not the conditions described with reference to FIGS. 9 to 11 are satisfied. In a case where the conditions are satisfied, the vehicle tracking unit 176 may add a point. In a case where the number of the points becomes equal to or greater than a predetermined threshold, the vehicle tracking unit 176 may determine that the preceding vehicle corresponds to a portion of the sidewall 232a.

For example, at determination timing at the predetermined intervals, in a case where the relative speed between the own vehicle 1 and the preceding vehicle that is in fact the portion 234 of the sidewall 232a is regarded as zero (0), the vehicle tracking unit 176 may increase a sidewall point by one point. At the determination timing, in a case where the angle formed by the speed vector 240 of the preceding vehicle and the tangential line 242 to the sidewall 232a at the depthwise position of the preceding vehicle is regarded as zero (0), the vehicle tracking unit 176 may increase the sidewall point by one point. At the determination timing, in a case where the horizontal distance from the preceding vehicle to the sidewall 232a is regarded as zero (0), the vehicle tracking unit 176 may increase the sidewall point by one point. It is to be noted that the vehicle tracking unit 176 may reset the sidewall point to zero (0) in a case where the own vehicle 1 is not traveling along a curve.

In a case where the number of the sidewall points is greater than or equal to a predetermined value, for example, ten points, the vehicle tracking unit 176 may determine that the preceding vehicle corresponds to a portion of the sidewall 232a. With such a configuration, it is possible for the vehicle tracking unit 176 to determine appropriately and stably that the preceding vehicle that has been tracked corresponds to a portion of the sidewall 232a.

In a case where the vehicle tracking unit 176 determines that the preceding vehicle corresponds to a portion of the sidewall 232a as described above, the vehicle tracking unit 176 may stop tracking the preceding vehicle. For example, the vehicle tracking unit 176 may exclude the portion 234 that has been recognized as the preceding vehicle, from the target to track. This saves the vehicle external environment recognition apparatus 120 from making the following control to the portion 234 as the preceding vehicle. With such a configuration, it is possible to exclude the preceding vehicle from the target to track at an early timing. This helps to prevent the vehicle tracking unit 176 from keeping on misrecognizing an actually-absent preceding vehicle as a preceding vehicle to track.

In the forgoing description, the vehicle tracking unit 176 may determine whether or not the preceding vehicle corresponds to a portion of the sidewall 232a, before the vehicle external environment recognition apparatus 120 starts the following control to the preceding vehicle identified by the identification object identifying unit 174. Accordingly, the vehicle external environment recognition apparatus 120 may keep from making the following control to the preceding vehicle until a result of the determination is obtained by the vehicle tracking unit 176 as to whether or not the preceding vehicle corresponds to a portion of the sidewall 232a. In other words, while the vehicle external environment recognition apparatus 120 is making the following control to a preceding vehicle, the vehicle tracking unit 176 does not determine whether or not the preceding vehicle corresponds to a portion of the sidewall 232a. With such a configuration, it is possible for the vehicle tracking unit 176 to determine whether or not the preceding vehicle corresponds to a portion of the sidewall 232a, in a state that the following control is not being executed. It is therefore possible to exclude appropriately the portion 234 recognized as the preceding vehicle from the target to track.

In addition, a program that causes a computer to serve as the vehicle external environment recognition apparatus 120, and a computer-readable storage medium in which the program is recorded may be also provided. In this example, the program may be adapted for data processing and may be written in any language or any description method. Non-limiting examples of the computer-readable storage medium may include a flexible disk, a magneto-optical disk, a ROM, a compact disc (CD), a digital versatile disc (DVD), and a Blu-ray Disc (BD, registered trademark).

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, in the forgoing example embodiment, description is given of an example where the vehicle tracking unit 176 may determine whether or not the preceding vehicle corresponds to a portion of the sidewall 232a. In a case where the vehicle tracking unit 176 determines that the preceding vehicle corresponds to a portion of the sidewall 232a, the vehicle tracking unit 176 may stop tracking the preceding vehicle.

However, this is non-limiting. In one alternative, in the identification object identifying process at a preceding stage, the identification object identifying unit 174 may determine whether or not the three-dimensional object corresponds to a portion of the sidewall 232a. In a case where the identification object identifying unit 174 determines that the three-dimensional object corresponds to a portion of the sidewall 232a, the identification object identifying unit 174 may refrain from identify the three-dimensional object as a preceding vehicle. With such a configuration as well, it is possible to exclude the three-dimensional object that corresponds to a portion of the sidewall 232a, from presumed preceding vehicles. As a result, it is possible to suppress the vehicle tracking unit 176 from misrecognizing an actually-absent preceding vehicle as a preceding vehicle to track.

Moreover, in the forgoing example embodiment, description is given of an example where the portion 234 of the sidewall 232a located on the left side of the leftward curve is misrecognized as a preceding vehicle. However, this is non-limiting. The same processing may apply to a portion of the sidewall 232b located on the right side of a rightward curve.

Furthermore, in the forgoing example embodiment, description is given of an example where the vehicle tracking unit 176 may determine whether or not the preceding vehicle corresponds to a portion of the sidewall 232a, before the vehicle external environment recognition apparatus 120 starts the following control to the preceding vehicle. However, this is non-limiting. The determination as to whether or not the preceding vehicle corresponds to a portion of the sidewall 232a, and the following control may be carried out in parallel. For example, while the vehicle external environment recognition apparatus 120 is making the following control to a predetermined preceding vehicle, the vehicle tracking unit 176 may determine whether or not another preceding vehicle corresponds to a portion of a sidewall, in other regions than the predetermined preceding vehicle at which the following control is being targeted.

It is to be noted that processes of the vehicle external environment recognition method described herein are not necessarily executed in time series in the order described in the flowchart. In one example, the processes may be executed in parallel. In another example, a sub-routine process may be additionally provided.

According to aspects of the technology, it is possible to reduce mistakes in recognizing a preceding vehicle to track.

Each of the vehicle external environment recognition apparatus 120, the central processor 154, the position calculator 170, the three-dimensional object determination unit 172, the identification object identifying unit 174, and the vehicle tracking unit 176 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the vehicle external environment recognition apparatus 120, the central processor 154, the position calculator 170, the three-dimensional object determination unit 172, the identification object identifying unit 174, and the vehicle tracking unit 176 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the vehicle external environment recognition apparatus 120, the central processor 154, the position calculator 170, the three-dimensional object determination unit 172, the identification object identifying unit 174, and the vehicle tracking unit 176 illustrated in FIG. 2.

The invention claimed is:

1. A vehicle external environment recognition apparatus to be applied to a vehicle, the vehicle external environment recognition apparatus comprising:
   a position calculation processor configured to calculate three-dimensional positions of respective blocks in a captured image;
   a three-dimensional object determination processor configured to group the blocks to put any two or more of the blocks that have the three-dimensional positions differing from each other within a predetermined range in a group and thereby determine three-dimensional objects;
   an identification object identifying processor configured to identify a preceding vehicle, which is moving, relative to the vehicle and a sidewall on a basis of the three-dimensional objects;
   a vehicle tracking processor configured to
   estimate a future position of the preceding vehicle to track the preceding vehicle identified by the identification object identifying processor,
   perform a following operation to cause the vehicle to follow the preceding vehicle being tracked;
   determine whether or not the preceding vehicle corresponds to a portion of the sidewall, and
   based on determining that the preceding vehicle corresponds to the portion of the sidewall, stop tracking the preceding vehicle, which is moving.

2. The vehicle external environment recognition apparatus according to claim 1, wherein the determining that the preceding vehicle corresponds to the portion of the sidewall is made based on determining that a relative speed between the preceding vehicle and the vehicle is regarded as zero.

3. The vehicle external environment recognition apparatus according to claim 1, wherein the determining that the preceding vehicle corresponds to the portion of the sidewall is made based on determining that an angle formed by a speed vector of the preceding vehicle with a tangential line to the sidewall at a depthwise position of the preceding vehicle is regarded as zero.

4. The vehicle external environment recognition apparatus according to claim 2, wherein the determining that the preceding vehicle corresponds to the portion of the sidewall is made based on determining that an angle formed by a speed vector of the preceding vehicle with a tangential line to the sidewall at a depthwise position of the preceding vehicle is regarded as zero.

5. The vehicle external environment recognition apparatus according to claim 1, wherein the determining that the preceding vehicle corresponds to the portion of the sidewall is made based on determining that a horizontal distance from the preceding vehicle to the sidewall is regarded as zero.

6. The vehicle external environment recognition apparatus according to claim 2, wherein the determining that the preceding vehicle corresponds to the portion of the sidewall is made based on determining that a horizontal distance from the preceding vehicle to the sidewall is regarded as zero.

7. The vehicle external environment recognition apparatus according to claim 3, wherein the determining that the preceding vehicle corresponds to the portion of the sidewall is made based on determining that a horizontal distance from the preceding vehicle to the sidewall is regarded as zero.

8. The vehicle external environment recognition apparatus according to claim 4, wherein the determining that the preceding vehicle corresponds to the portion of the sidewall is made based on determining that a horizontal distance from the preceding vehicle to the sidewall is regarded as zero.

9. A vehicle external environment recognition apparatus to be applied to a vehicle, the vehicle external environment recognition apparatus, comprising circuitry programmed to
   calculate three-dimensional positions of respective blocks in a captured image,
   group the blocks to put any two or more of the blocks that have the three-dimensional positions differing from each other within a predetermined range in a group and thereby determine three-dimensional objects,
   identify a preceding vehicle, which is moving, relative to the vehicle and a sidewall on a basis of the three-dimensional objects, estimate a future position of the preceding vehicle to track the preceding vehicle,
   determine whether or not the preceding vehicle identified corresponds to a portion of the sidewall, and
   based on determining that the preceding vehicle corresponds to the portion of the sidewall, stop tracking the preceding vehicle, which is moving.

10. The vehicle external environment recognition apparatus according to claim 9, wherein the determining that the preceding vehicle corresponds to the portion of the sidewall is made based on determining that a relative speed between the preceding vehicle and the vehicle is regarded as zero.

11. The vehicle external environment recognition apparatus according to claim 9, wherein the determining that the preceding vehicle corresponds to the portion of the sidewall is made based on determining that an angle formed by a speed vector of the preceding vehicle with a tangential line to the sidewall at a depthwise position of the preceding vehicle is regarded as zero.

12. The vehicle external environment recognition apparatus according to claim 9, wherein the determining that the preceding vehicle corresponds to the portion of the sidewall is made based on determining that a horizontal distance from the preceding vehicle to the sidewall is regarded as zero.

\* \* \* \* \*